(12) United States Patent
Ohkubo et al.

(10) Patent No.: US 6,504,305 B1
(45) Date of Patent: Jan. 7, 2003

(54) FLUORESCENT LAMP

(75) Inventors: Kazuaki Ohkubo, Takatsuki (JP);
Yoshinori Tanabe, Hirakata (JP);
Masanori Shimizu, Kyotanabe (JP);
Takeshi Arakawa, Kyoto (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/657,690

(22) Filed: Sep. 8, 2000

(30) Foreign Application Priority Data

Oct. 21, 1999 (JP) .......................... 11-300250
May 22, 2000 (JP) ....................... 2000-150680

(51) Int. Cl.⁷ .............................................. H01J 13/46
(52) U.S. Cl. .............................. 315/58; 315/73; 337/22
(58) Field of Search ..................... 315/73, 74, 58, 315/52, 53, 71, 104; 313/629, 631; 337/22–24

(56) References Cited

U.S. PATENT DOCUMENTS

| 3,954,316 A | 5/1976 | Luchetta ..................... 315/96 |
| 3,956,665 A | 5/1976 | Westphal ..................... 315/95 |
| 4,010,399 A | 3/1977 | Bessone et al. ............. 315/101 |
| 4,082,981 A | 4/1978 | Morton et al. ................ 315/97 |
| 4,156,831 A | 5/1979 | Cassidy et al. ............. 315/106 |
| 4,163,176 A | 7/1979 | Cohen et al. ................. 315/53 |
| 4,317,069 A * | 2/1982 | Burgess .................. 315/227 R |
| 4,435,670 A | 3/1984 | Evans et al. .................. 315/58 |
| 4,513,225 A * | 4/1985 | Lemmers et al. ............. 315/87 |
| 4,565,948 A * | 1/1986 | Kimura et al. ............. 313/487 |
| 4,695,768 A | 9/1987 | Covington et al. ........... 315/73 |
| 4,857,808 A | 8/1989 | Lally et al. ................. 315/100 |
| 5,449,971 A * | 9/1995 | Scott et al. ................. 313/631 |

FOREIGN PATENT DOCUMENTS

| JP | 58-184297 | 10/1983 |
| JP | 59-90398 | 5/1984 |
| JP | 59-170962 | 11/1984 |
| JP | 5-166588 | 7/1993 |
| JP | 7-65968 | 3/1995 |
| JP | 9-293597 | 11/1997 |

* cited by examiner

*Primary Examiner*—Don Wong
*Assistant Examiner*—Ephrem Alemu
(74) *Attorney, Agent, or Firm*—Renner, Otto, Boisselle & Sklar

(57) ABSTRACT

A fluorescent lamp is capable of easily achieving a reduction of power consumption only be being mounted on a conventional lighting apparatus, whether or not the lighting apparatus has a dimming function. The fluorescent lamp includes an arc tube; and a current suppressing section for suppressing a lamp current which flows in the arc tube, after the elapse of a predetermined time after the power is turned on, and during an operation of the fluorescent lamp.

15 Claims, 14 Drawing Sheets

Lamp current

FLUORESCENT LAMP

BACKGROUND OF THE INVENTION

1. Field of the Invention:

The present invention relates to a reduced power consumption fluorescent lamp.

2. Description of the Related Art:

In recent years, many efforts have been devoted in almost all fields of human activity so as to save energy in view of the problems of global warming or efficient use of energy resources. Regarding the lighting by fluorescent lamps, the power consumption has been reduced by employing inverter electronic circuits for ignition circuits. Conventional fluorescent lamps do not intrinsically have any power-saving functions, and the following two methods have been used to achieve a power saving in fluorescent lamp lighting apparatuses: i.e., (1) partial operation by turning off some of the lamps used; and (2) use of the lighting apparatus having a dimming function. These two conventional techniques will now be explained.

(1) Partial operation by turning off some of the lamps

For lighting public areas and aisles in a multi-unit housing, e.g., an apartment building, or in places where a large number of fluorescent lamps are used, such as in offices, factories, and warehouses, fluorescent lamp apparatuses having a magnetic ballast are used in large numbers since they are relatively cheap. The fluorescent lamps used for these establishments do not have a power-reduction function by itself, and therefore the lamps are turned off when or where they are needed, or partially operated by turning off some of the lamps.

(2) Use of a lighting apparatus having a dimming function

By using a fluorescent lamp lighting apparatus having a dimming function, the operating power for the fluorescent lamp is directly suppressed, thereby operating the lamp with a reduced power.

The method (1), i.e., partial operation by turning off some of the lamps, can be implemented easily without requiring any additional investment in equipment for, e.g., replacing the existing lighting apparatuses by ones consuming a reduced power. Although this method achieves some control over the degree of power saving, the partial absence of the lighting creates a problem of gloomy atmosphere due to the uneven luminance or a problem of increased danger due to the insufficient illumination.

The method (2), i.e., use of a lighting apparatus having a dimming function, can only achieve a power reduction by replacing the aforementioned prevailing inexpensive lighting apparatuses, i.e., lighting apparatuses without a dimming function, by expensive fluorescent lighting apparatuses having a dimming function.

SUMMARY OF THE INVENTION

In one aspect of the invention, a fluorescent lamp, includes: a first electrode pin; a second electrode pin; and a filament electrically connected to the first electrode pin and the second electrode pin, wherein: the first electrode pin and the second electrode pin are configured so as to be respectively connectable to a power supply-side socket and a starter-side socket of a lighting apparatus, when the fluorescent lamp is in a first connection state, in which the first electrode pin is connected to the power supply-side socket and the second electrode pin is connected to the starter-side socket, the fluorescent lamp operates in a first power mode, in which the fluorescent lamp consumes a first power; and when the fluorescent lamp is in a second connection state, the first electrode pin is connected to the starter-side socket and the second electrode pin is connected to the power supply-side socket, the fluorescent lamp operates in a second power mode, in which the fluorescent lamp consumes a second power which is lower than the first power.

In one embodiment of the invention, a fluorescent lamp further includes a current suppressing circuit electrically connected to one of the first electrode pin and the second electrode pin.

In another embodiment of the invention, a fluorescent lamp further includes a first current suppressing circuit electrically connected to the first electrode pin and a second current suppressing circuit electrically connected to the second electrode pin, wherein the quantity of a current suppressed by the first current suppressing circuit and the quantity of a current suppressed by the second current suppressing circuit are different.

In still another embodiment of the invention, the current suppressing circuit is provided inside a base for fixing the first electrode pin and the second electrode pin.

In still another embodiment of the invention, the fluorescent lamp has a mark for identifying whether the fluorescent lamp is in the first connection state or the second connection state.

In another aspect of the invention, a fluorescent lamp includes: a first electrode pin; a second electrode pin; filament electrically connected to the first electrode pin and the second electrode pin, a first current suppressing circuit electrically connected to the first electrode pin; and a second current suppressing circuit electrically connected to the second electrode pin, wherein: the quantity of a current suppressed by the first current suppressing circuit and the quantity of a current suppressed by the second current suppressing circuit are substantially the same.

In one embodiment of the invention, the first current suppressing circuit and the second current suppressing circuit are provided inside a base for fixing the first electrode pin and the second electrode pin.

In still another aspect of the invention, a fluorescent lamp includes: an arc tube; and a current suppressing section for suppressing a lamp current which flows in the arc tube, after the elapse of a predetermined time after the power is turned on, and during an operation of the fluorescent lamp.

In one embodiment of the invention, the current suppressing section suppresses the lamp current based on at least one parameter.

In another embodiment of the invention, the at least one parameter includes one of parameters representing time, temperature, luminous energy, current, and voltage.

In still another embodiment of the invention, the current suppressing section includes an impedance varying section for varying the impedance of the current suppressing section.

In still another embodiment of the invention, the impedance varying section includes a thermosensitive element.

In still another embodiment of the invention, the current suppressing section includes a phase control section for controlling the quantity of the lamp current corresponding to the phase of the lamp current.

In still another embodiment of the invention, the phase control section includes a two-way thyristor.

In still another embodiment of the invention, a chromaticity coordinate of a light source color of the arc tube meets the standard of JIS Z9112 "The classification of fluorescent lamps by the light source color and the chromaticity".

In still another embodiment of the invention, the fluorescent lamp efficiency is 80 1 m/W or more.

Thus, the invention described herein makes possible the advantage of providing a fluorescent lamp capable of easily achieving a reduction of power consumption only by being mounted on a conventional lighting apparatus, whether or not the lighting apparatus has a dimming function.

This and other advantages of the present invention will become apparent to those skilled in the art upon reading and understanding the following detailed description with reference to the accompanying figures.

DESCRIPTION OF THE PREFERRED EMBODIMENTS

Figure 1:
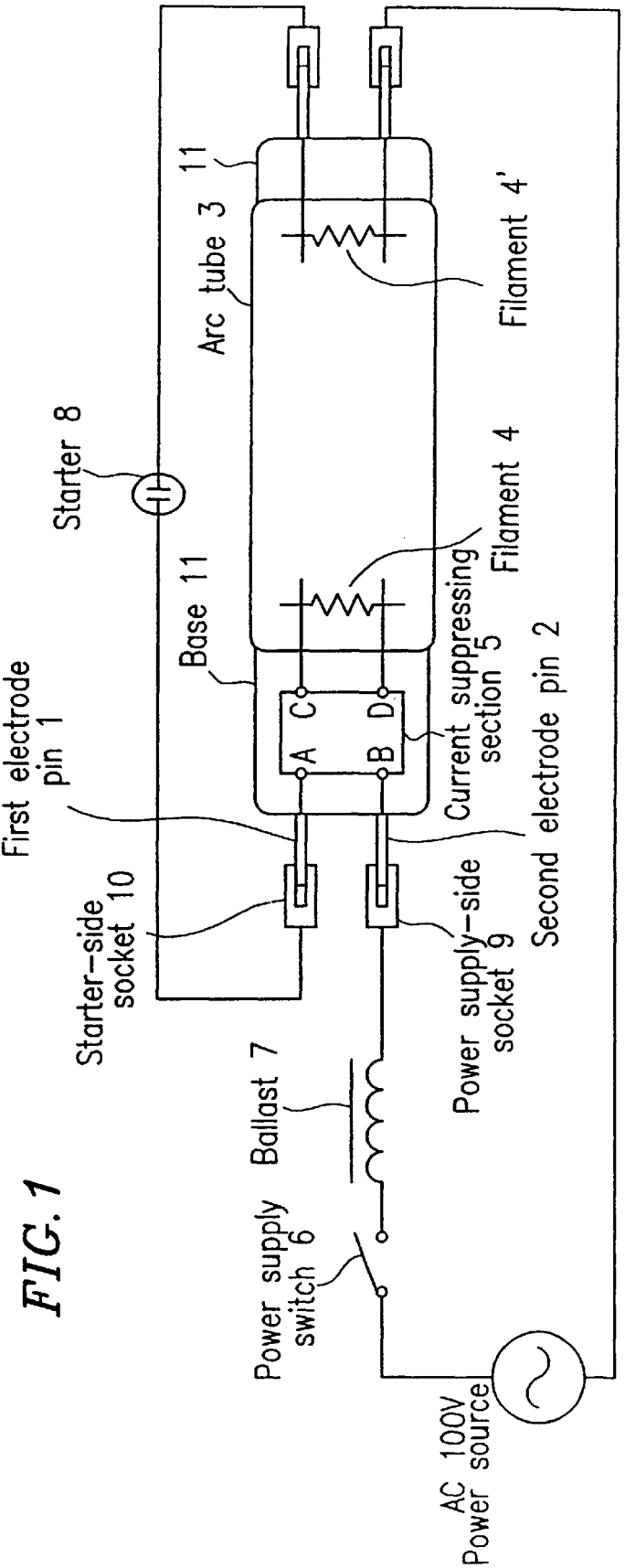
FIG. 1 is a circuit diagram of a fluorescent lamp ignition circuit illustrating the principle of the present invention.

The principle of the present invention will now be described with reference to FIG. 1. FIG. 1 is a circuit diagram of a fluorescent lamp ignition apparatus employing a magnetic ballast and a starter (a glow discharge tube).

With reference to FIG. 1, a first electrode pin 1 and a second electrode pin 2 are electrically connected to a filament 4 in an arc tube 3 via a current suppressing section 5. The first electrode pin 1 and the second electrode pin 2 are so configured as to be connectable, respectively, to a starter side socket 10 and a power supply-side socket 9 of a fluorescent lamp lighting apparatus. The fluorescent lamp lighting apparatus includes a switch 6, a ballast 7, and a starter 8.

The current suppressing section 5 suppresses a lamp current flowing in the arc tube 3, after the elapse of a predetermined time after the power is turned on, and during operation of the fluorescent lamp. The current suppressing section 5 is provided inside a base 11 for fixing the first electrode pin 1 and the second electrode pin 2.

Figure 3A:
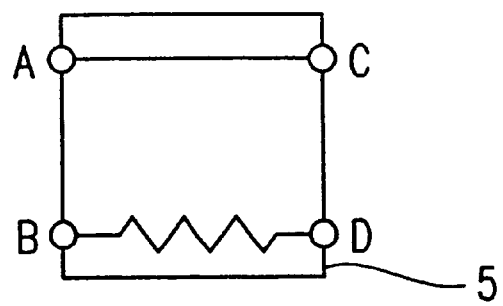
FIG. 3A is a diagram showing a current suppressing section 5 connecting a resistor for suppressing the current between contact points B and D.
Figure 4A:
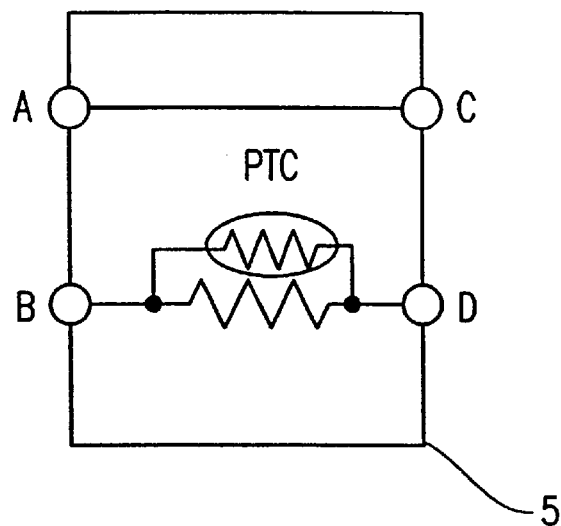
FIG. 4A is a diagram showing a current suppressing section 5 connecting a resistor between the contact points B and D, and further connecting a thermistor (PTC thermistor) parallel to the resistor.
Figure 5A:
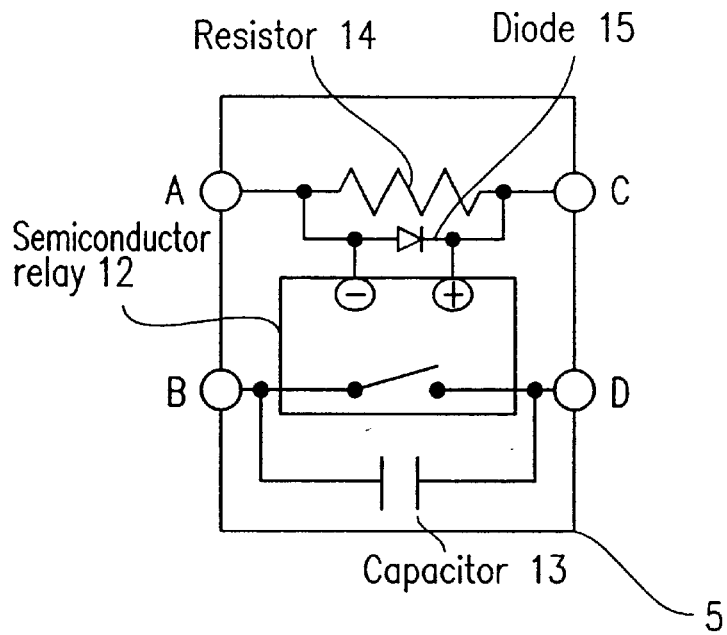
FIG. 5A is a diagram showing a current suppressing section 5 connecting a semiconductor relay 12 and a capacitor 13 between the contact points B and D.
Figure 13:
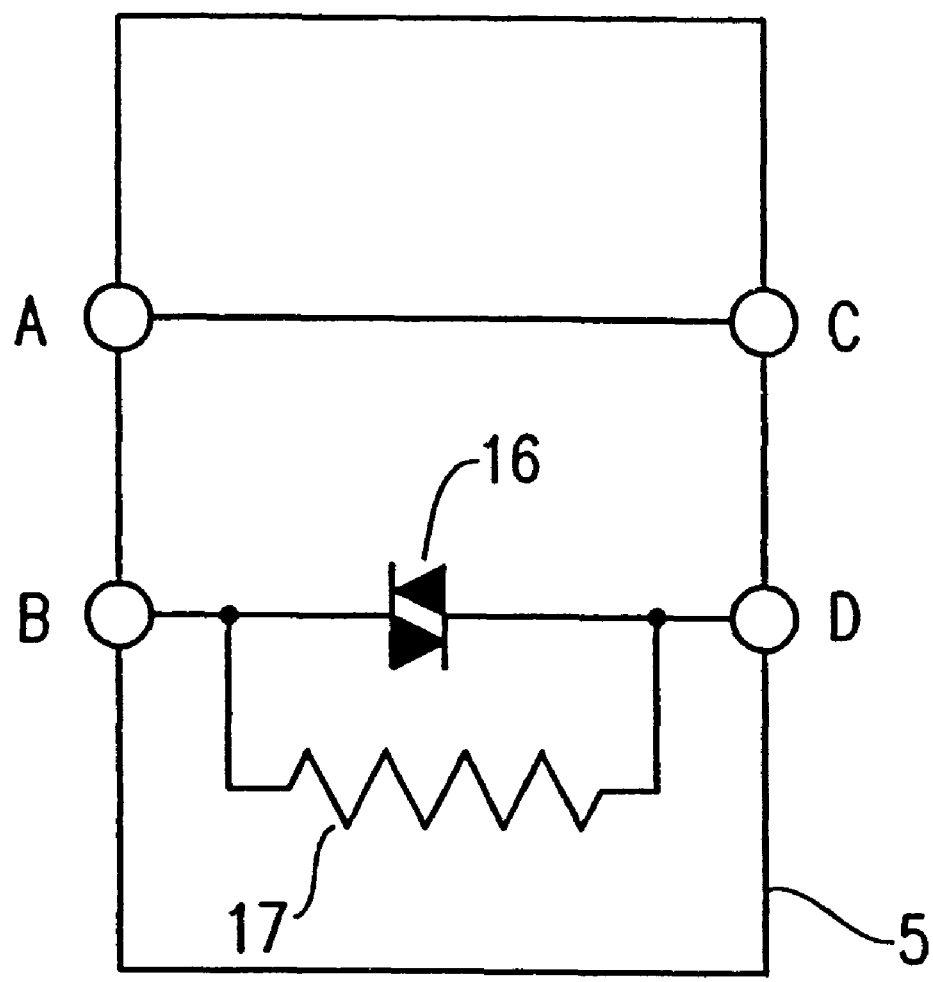
FIG. 13 is a diagram showing a current suppressing section employing a two-way thyristor 16 and a resistor 17 connected between the contact points B and D.

As the current suppressing section 5, a variety of types of devices can be used, such as a resistor type shown in FIG. 3A, a thermosensitive element type shown in FIG. 4A, a relay type shown in FIG. 5A, and a thyristor type shown in FIG. 13. In terms of the current suppressing section 5, fluorescent lamps will now be described in the following order: (1) a conventional fluorescent lamp without a current suppressing section; (2) a fluorescent lamp employing a resistor type current suppressing section 5 shown in FIG.

3A; (3) a fluorescent lamp employing a thermosensitive element type current suppressing section 5 shown in FIG. 4A; (4) a fluorescent lamp employing a relay type current suppressing section 5 shown in FIG. 5A; and (5) a fluorescent lamp employing a thyristor type current suppressing section 5 shown in FIG. 13.

(1) A conventional fluorescent lamp without a current suppressing section.

First, the start of a conventional fluorescent lamp without a current suppressing section will be described with reference to FIGS. 1 and 2. This is the case where the fluorescent lamp in FIG. 1 is implemented with contact points A and C and contact points B and D each being short-circuited.

Figure 2:
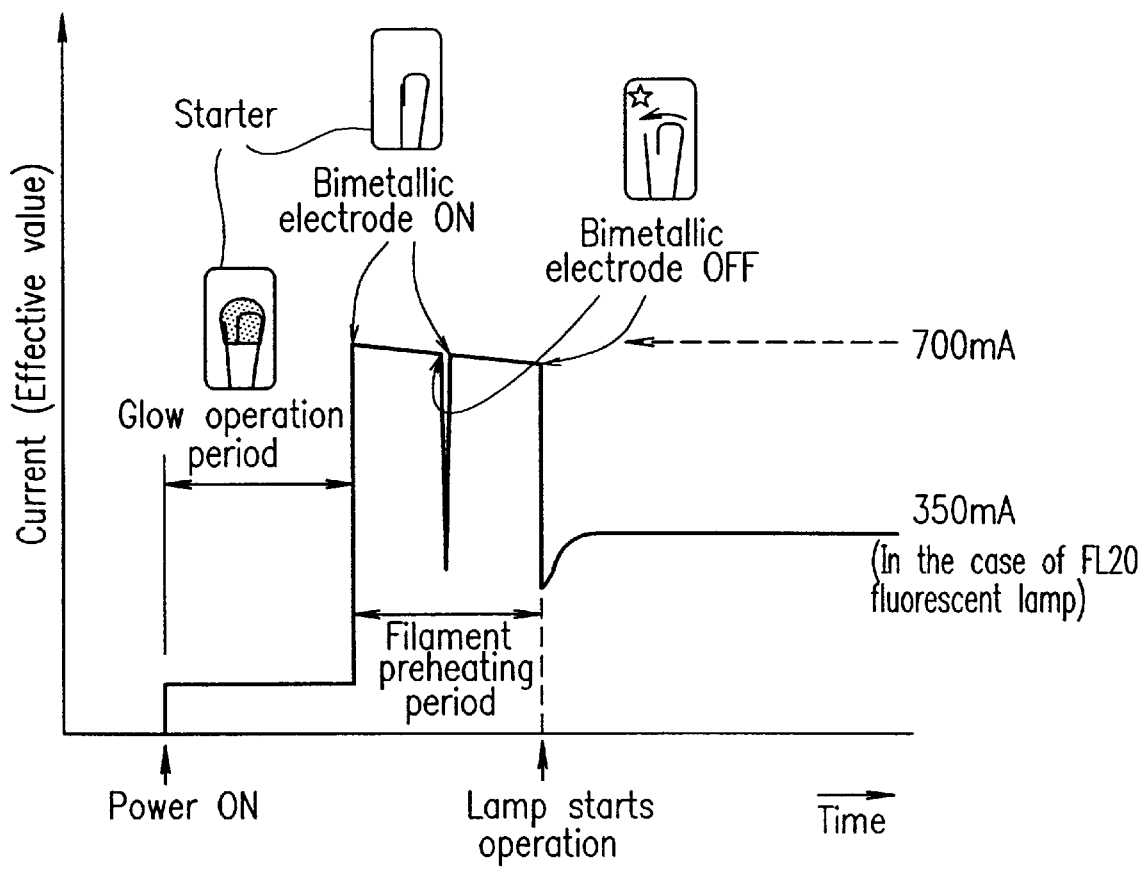
FIG. 2 is a diagram showing a temporal change of a current flowing into the electrodes of a fluorescent lamp at the time when the fluorescent lamp is started.

FIG. 2 is a diagram showing the temporal change of a current which enters the fluorescent lamp via the power supply-side socket 9 at the time when the fluorescent lamp is started. When the power switch 6 is turned on, a voltage which is close to the supply voltage is applied between bimetallic electrodes in the starter 8. A glow discharge is then created between the bimetallic electrodes in the starter 8 (the glow operation period). This discharge increases the temperature of the bimetallic electrodes, whereby the bimetallic electrodes come closer to each other and finally contact each other (bimetallic electrodes ON). When the bimetallic electrodes turn ON, a large current (in the case of an FL20 fluorescent lamp, about 700 mA) flows from the power supply-side socket 9 through the second electrode pin 2, the filament 4, the first electrode pin 1, starter 8, and a filament 4', whereby the filaments 4 and 4' glow red and an electron emitting material (i.e., emitter deposited on the filaments 4 and 4' emits thermions. The glow discharge of the starter 8 has already stopped at this moment, whereby the temperature of the bimetallic electrodes gradually decreases and the bimetallic electrodes finally turn OFF. At this moment, a voltage higher than the supply voltage (i.e., a start voltage) is applied between the bimetallic electrodes in the starter 8 and between the opposing filaments 4 and 4' in the arc tube 3. If the number of the thermions in the vicinity of the filaments 4 and 4' is sufficiently large, a discharge starts in the arc tube 3 (i.e., the lamp operation is started). At this time, the current is flowing from the power supply-side socket 9 through the second electrode pin 2, the filament 4, as the discharge in the arc tube 3, and then through the opposite filament 4'. At this time, no current flows in the starter 8, and the operation of the starter 8 is ceased. The current flowing in the arc tube 3 as a discharge at this point is called a lamp current. In the case of an FL20 fluorescent lamp, the magnitude of the lamp current is approximately 250 mA. If the preheating of the filaments 4 and 4' is insufficient and the discharge in the arc tube 3 is not maintained, a glow discharge is again started in the starter 8. In this example, if the current flowing in the filaments 4 and 4' is low, or if the ambient temperature is low, the preheating period becomes longer due to the lower emission of thermions. This causes the filaments 4 and 4' to wear out, and in turn reduces the lamp life.

(2) A fluorescent lamp employing a resistor type light suppressing section 5 shown in FIG. 3A.

As shown in FIG. 3A, in this type of fluorescent lamp, a resistor is connected between the contact points B and D of the current suppressing section, so as to suppress the lamp current.

Figure 3B:
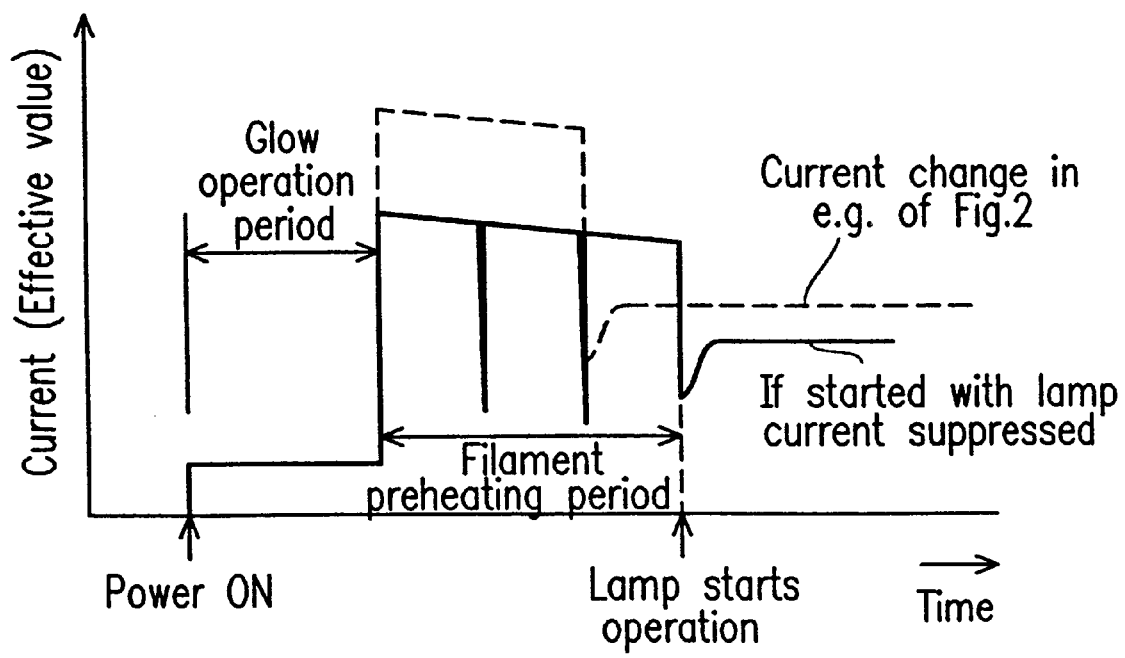
FIG. 3B is a diagram showing a temporal change of a current flowing into a fluorescent lamp through a power supply-side socket 9 at the time when the fluorescent lamp is started.

FIG. 3B shows the temporal change of a current which enters a fluorescent lamp employing this type of current suppressing section, through the power supply-side socket 9 (FIG. 1) at the time when the lamp is started. Since the resistor reduces the entering current, the preheating period of the filament is extended. However, unlike the conventional fluorescent lamp in FIG. 2, which does not have a current suppressing section, the current suppressing section 5 suppresses the lamp current after a predetermined time after the power is turned ON (in this case immediately after the power is turned ON) and during the operation of the fluorescent lamp, thereby reducing the power consumption.

(3) A fluorescent lamp employing a thermosensitive element type current suppressing section 5 shown in FIG. 4A In this type of current suppressing section 5, a resistor is connected between the contact points B and D, and a thermosensitive thermistor (a PTC thermistor) is connected parallel to the resistor. The PTC thermistor serves as means for varying the impedance of the current suppressing section 5, and suppresses the lamp current by using the temperature of the PTC thermistor as a parameter. If a sufficient current is not supplied at the time when the lamp is started, the preheating period of the filaments of the lamp is extended, which degrades the starting ability of the lamp and reduces the lamp life. Therefore, in this type of current suppressing section 5, a PTC thermistor limits the current suppressing function of the current suppressing circuit (in this case, a resistor) from the time when the power is ON until the time when the lamp starts operating. After the lamp starts operating, the current suppressing circuit is activated so as to suppress the power consumption of the fluorescent lamp.

Figure 4B:
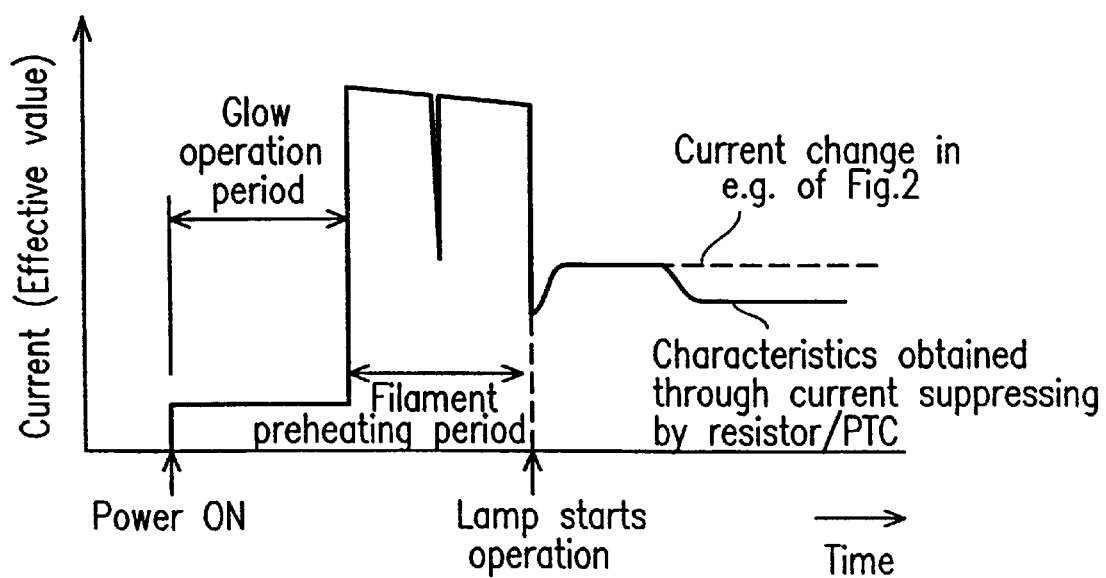
FIG. 4B is a diagram showing the temporal change of a current flowing into a fluorescent lamp through the power supply-side socket 9 at the time when the fluorescent lamp is started.
Figure 6:
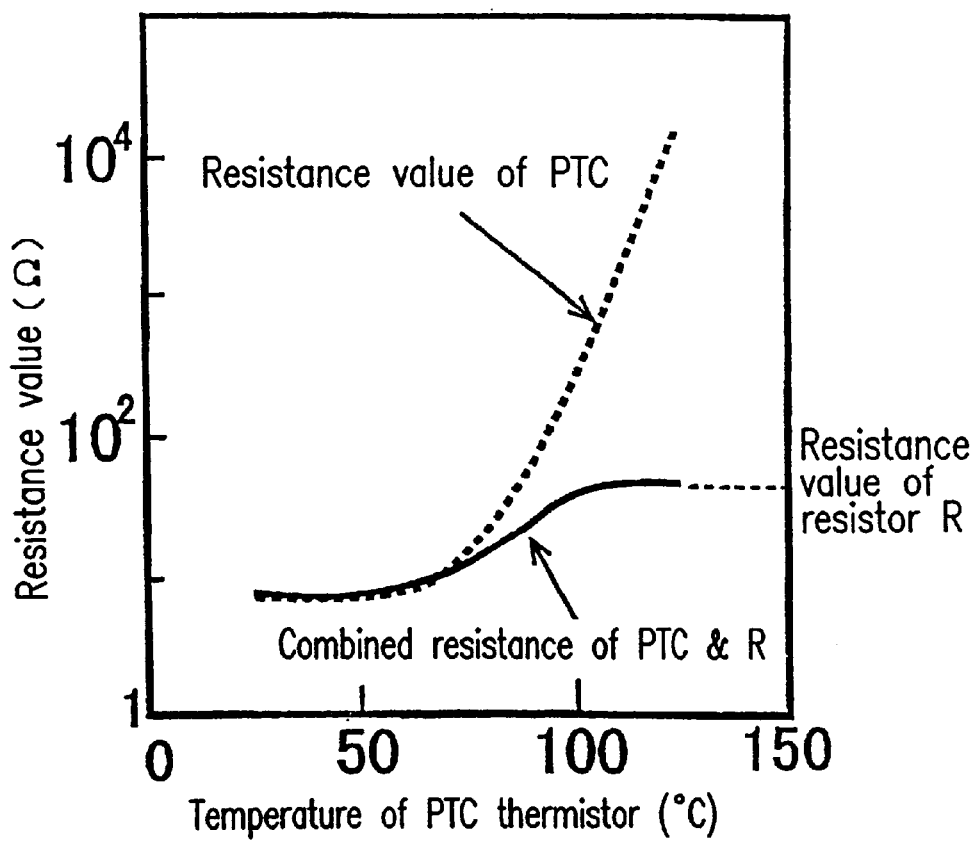
FIG. 6 is a graph showing ambient temperature characteristics of a combined resistance in the case where a PTC thermistor having a Curie point temperature of 80° C. and a resistance value of 10 Ω, and a resistor having a resistance value of 75 Ω are connected in parallel.

FIG. 6 is a graph showing the ambient temperature characteristics of a combined resistance obtained by connecting in parallel a PTC thermistor having a Curie point temperature of 80° C. and a resistance value of 5 $\Omega$, and a resistor having a resistance value of 75 $\Omega$. The Curie point temperature is a temperature at which the resistance of a substance becomes double the resistance at 25° C. A circuit configured in this combination may be incorporated into the base 11 of a fluorescent lamp FL20SSW/18 as shown in FIG. 1. When the lamp is started, the temperature inside the base 11 is less than 80° C., and therefore the lamp is ignited in a condition where a resistor having a resistance value of about 5 $\Omega$ is inserted between the filament 4 and the second electrode pin 2, i.e. in a condition where substantially no current suppression occurs. FIG. 4B shows a temporal change of the current which enters the fluorescent lamp through the power supply-side socket 9 at the time when the lamp is started. As is apparent from FIG. 4B, since the filament is preheated with a current which is substantially the same as that when the current is not suppressed, the preheating period is as short as that in the conventional example and the lamp can be ignited without much wear-out of the filament.

As the discharge in the arc tube 3 stabilizes after the lamp is ignited, heat is generated by the lamp discharge and the current flowing in the PTC thermistor and the resistor. Since the PTC thermistor is sealed in the base 11, the heat increases the temperature of the PTC thermistor, thereby increasing the resistance value of the PTC thermistor. This causes the lamp current to be supplied through the resistor to the arc tube 3, whereby the lamp operates in a condition where the lamp power is suppressed.

Figure 7:
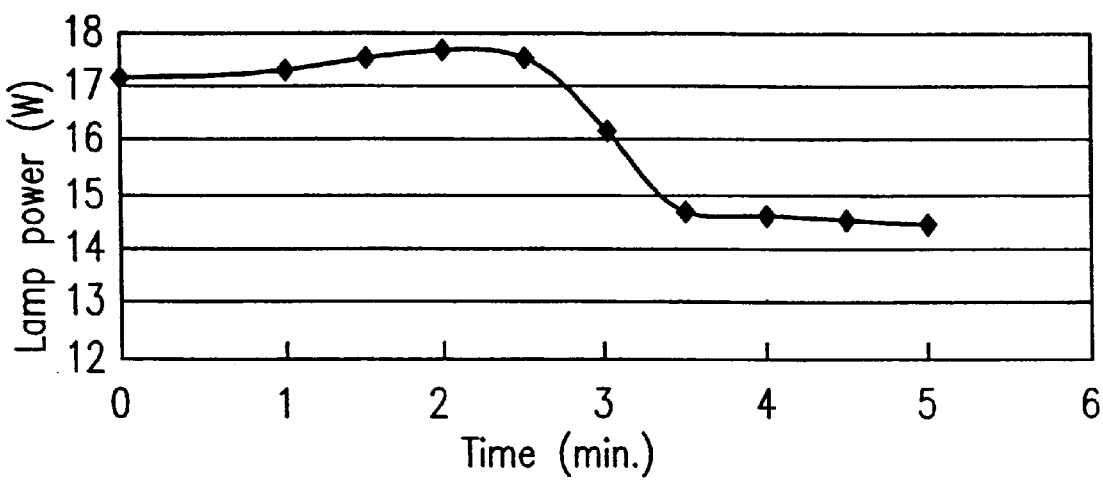
FIG. 7 is a graph showing a change of the lamp power after a fluorescent lamp is started.

FIG. 7 is a graph showing a change of the lamp power after the fluorescent lamp is started. As shown in FIG. 7, approximately three minutes after the lamp is started, the temperature of the PTC thermistor in the base 11 exceeds the Curie point, whereby the lamp current flows through the resistor. The lamp power stays at a constant value of about 14.5 W including the power consumption of the current suppressing resistor. This means that a fluorescent lamp with a lamp power of 18 W is actually operated with a lamp power of 14.5 W (the value including the power consumption of the current suppressing resistor).

When a magnetic ballast is used, a reduction of the lamp current also leads to the reduction of the copper loss of the ballast. Therefore, according to the present invention, the power consumption including the power loss of the ballast is suppressed at 17.2 W as opposed to 21.3 W in the conventional example. The suppressed power consumption can be varied as desired by changing the resistance value of the resistor. If the lamp is started immediately after it is turned off, the lamp is bound to be started in a condition where the temperature of the PTC thermistor is high. In such a case, however, the temperature of the fluorescent lamp itself is sufficiently high and the pressure of the memory vapor inside the lamp is also sufficiently high, and therefore the preheating period of the filament is short and the starting ability is not reduced.

Figure 8:
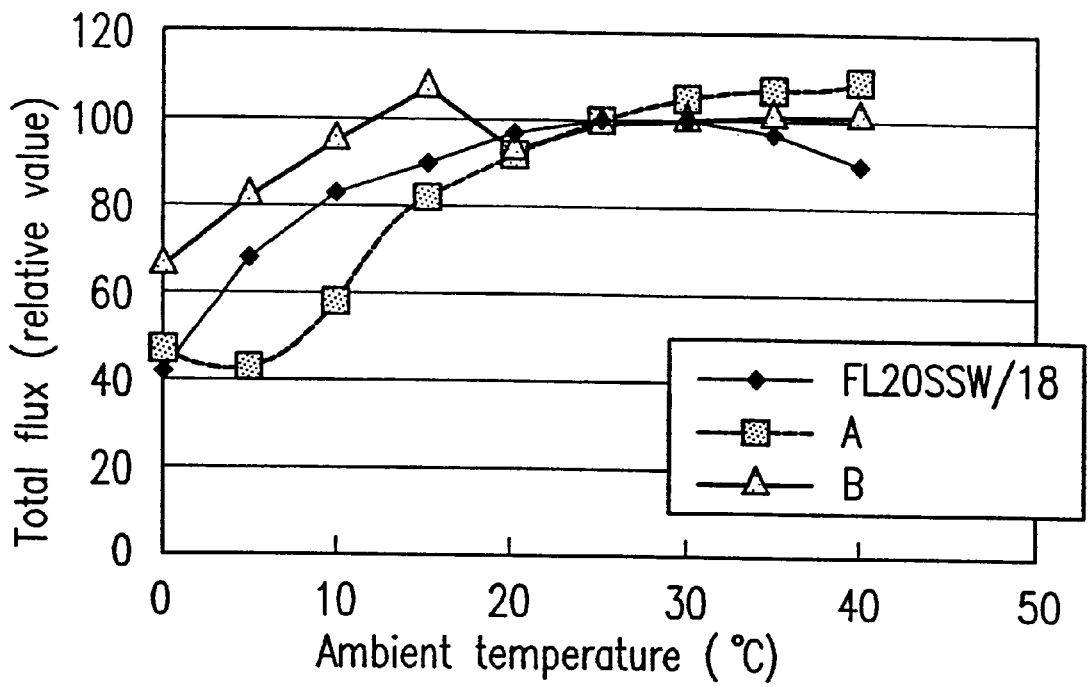
FIG. 8 is a graph showing temperature characteristics of the total flux of a fluorescent lamp when the operation temperature of the PTC thermistor is changed.
Figure 9:
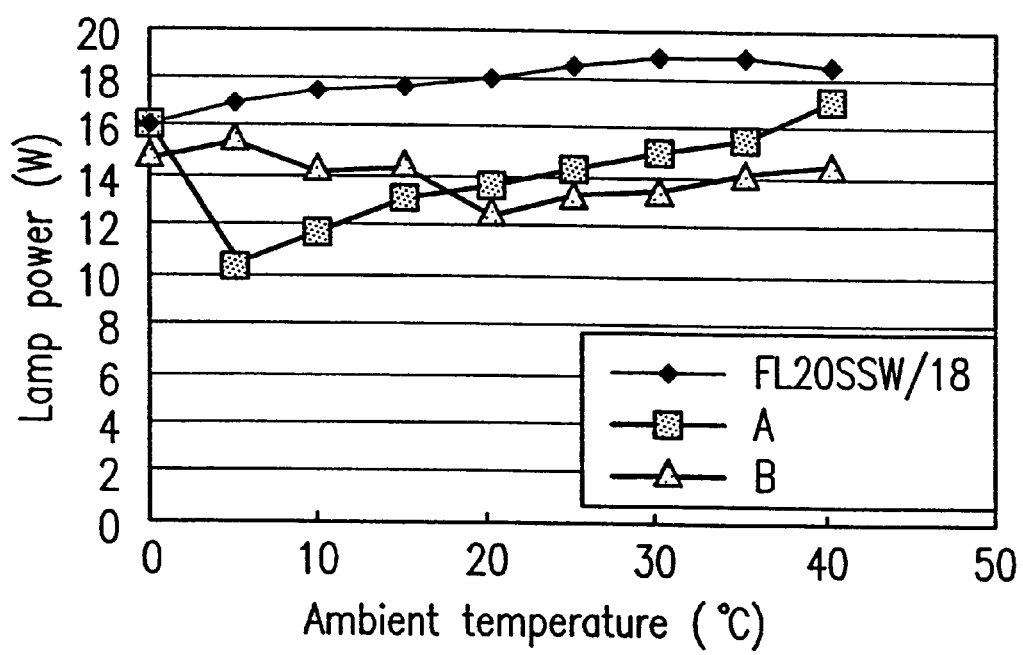
FIG. 9 is a graph showing temperature characteristics of the lamp power flux of a fluorescent lamp when the operation temperature of the PTC thermistor is changed.

According to the present example, even if the fluorescent lamp is started when at a low temperature, the operation of the lamp does not lapse by the suppression of the current supplied to the lamp. This is because the temperature of the PTC thermistor does not increase until the discharge in the lamp stabilizes. Furthermore, by selecting the Curie point temperature of the PTC thermistor, the operating condition of the lamp is easily changed. For example, by limiting the operation of the PTC thermistor at 5° C. or less so as not to suppress the current supplied to the lamp, the lamp can be normally operated at 5° C. or less. On the other hand, the lamp can be operated with a reduced power at more than 5° C. Therefore, it is effective in overcoming a decrease of luminous flux at a low temperature which is inherent to fluorescent lamps. As an example, the thermal characteristics of the total flux of a fluorescent lamp are compared in FIG. 8 by varying the operation temperature of the PTC thermistors. FIG. 9 is a graph showing temperature characteristics of the lamp power of the lamp in FIG. 8. FIG. 8 shows the characteristics normalized by the total flux at an ambient temperature of 25° C. Curve A in the graph represents the lamp having a PTC thermistor whose temperature does not exceed the Curie point at an ambient temperature of 5° C. or less, and Curve B represents the lamp having a PTC thermistor whose temperature does not exceed the Curie point at an ambient temperature of 20° C. or less. In both cases, the change of the total flux with regard to the ambient temperature is smaller than that of the normal FL20SSW/18 lamp. The thermal characteristics may be changed depending on the selected PTC thermistor. As shown in FIG. 9, at a low temperature, the lamp power of the conventional fluorescent lamp also decreases as the ambient temperature decreases. Therefore, the power consumption is sufficiently small even if the PTC thermistor does not operate.

Although the example in FIG. 4A uses a resistor as the element which directly suppresses the lamp current, note that a capacitor or a coil (inductor), or an element combining these can also be used.

(4) A fluorescent lamp employing a relay type current suppressing section 5 shown in FIG. 5A As shown in FIG. 5A, according to this example, a current suppressing circuit including a semiconductor relay 12 and a capacitor 13 is connected between the contact point B and D of the current suppressing section 5. This type of current suppressing section 5 includes means for varying the impedance of the current suppressing section 5 and suppresses the lamp current based on the current flowing in the current suppressing section 5 as a parameter.

With reference to FIG. 5a, the capacitor 13 is connected between the contact points B and D of the current suppressing section 5, and the relay points of the semiconductor relay 12 are connected parallel to the capacitor 13 so as to be able to short-circuit between the contact points B and D. A resistor 14 and a diode 15 are connected between the contact points A and C so as to detect the current flowing in the starter 8 (FIG. 1) at the time when the lamp is started. The detected current is converted into a voltage signal which is used as a driving signal for the semiconductor relay 12. With this configuration, when the lamp is started, the relay contacts are short-circuited by the current flowing in the starter 8, whereby the lamp current does not pass through the current suppressing circuit (in this case, the capacitor 13). Therefore, the lamp current is directly supplied to the lamp without suppression, and the lamp is easily started. After the start, the lamp voltage decreases to the discharge-starting voltage of the starter or below, so that a current does not flow in the starter 8. This terminates the driving signal for the semiconductor relay 12, thereby opening the relay contacts, and the lamp current is supplied through the current suppressing circuit. Accordingly, the lamp operates in a condition where the power consumption is suppressed. Since the driving signal for an semiconductor relay, e.g., a solid state relay, should usually be a direct current, the negative component of the alternating current flowing in the starter 8 is cut by the diode 15, and then the voltage is converted by the resistor 14 so as to drive the semiconductor relay 12. In this state, the relay points are closed responsive only to the positive-side half wave of the alternating lamp current. In order to make the relay points closed responsive to the total wave of the alternating lamp current while the current is flowing in the resistor 14, i.e., while the current is flowing in the starter 8, an semiconductor relay is used which has a function of delaying the relay contact recovery by 16.7 m sec. or more to the driving signal. This is also achieved by smoothing the driving voltage waveform by means of connecting the capacitor in parallel to the diode.

Figure 5B:
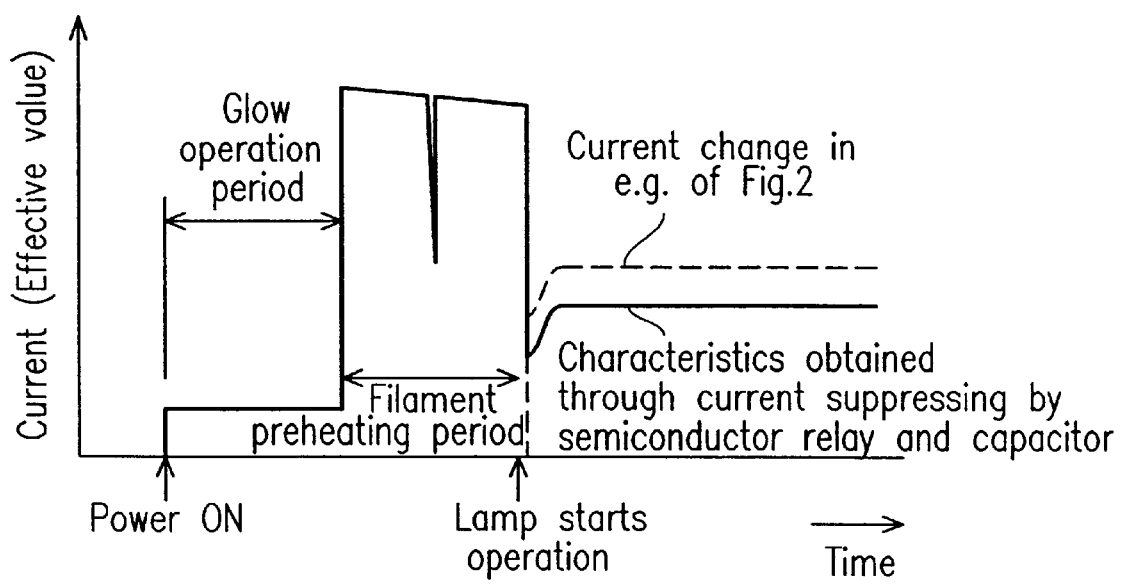
FIG. 5B is a diagram showing the temporal change of a current flowing into a fluorescent lamp through the power supply-side socket 9 at the time when the fluorescent lamp is started.

FIG. 5B shows a temporal change of the current which enters the fluorescent lamp through the power supply-side socket 9 at the time when the lamp is started. According to the present method, the relay points of the semiconductor relay 12 are ON during the preheating of the filaments 4 and 4', whereby the filaments 4 and 4' are preheated with the current similar to that when the current is not suppressed. Therefore, the preheating time is as short as in the conventional example, and thus the lamp is ignited without much wear-out of the filaments. When the current stops flowing into the starter 8 after the lamp starts operating, the lamp current immediately starts flowing into the capacitor 13 so as to immediately set the fluorescent lamp in a reduced power operation.

Although the example shown in FIG. 5A uses a capacitor for an element which directly suppresses the lamp current, note that a resistor or a coil (inductor), or an element combining these can also be used.

(5) A fluorescent lamp employing a thyristor type current suppressing section 5 shown in FIG. 13.

According to this type of current suppressing section 5, a current suppressing circuit including a two-way thyristor 16 (also referred to as a bipolar two-way two-terminal thyristor, or an SSS (Silicon Symmetrical Switch) element) and a resistor 17 is connected between the contact points B and D of the current suppressing section 5. This type of current suppressing section 5 includes means for suppressing the quantity of the lamp current corresponding to the phase of the lamp current, i.e., the lamp current is suppressed based on the phase of the lamp current as a parameter. This type of current suppressing section 5 can be implemented either in a 20 W fluorescent lamp (FL20 fluorescent lamp) or a 40 W fluorescent lamp (FL40 fluorescent lamp).

With reference to FIG. 13, a resistor 17 is connected between the contact points B and D of the current suppressing section 5, and the two-way thyristor 16 is connected parallel to the resistor 17.

As methods for operating this type of current suppressing section 5, both a cycle-by-cycle control method and a start supporting method are usable. The cycle-by-cycle control method employs a two-way thyristor 16 which meets the condition $V_{BO}<V_{P2}<V_{P1}$. The start supporting method employs a two-way thyristor 16 which meets the condition $V_{P2}<V_{BO}<V_{P1}$. Here, $V_{BO}$ represents a breakover voltage of the two-way thyristor 16, $V_{P1}$ represents a peak voltage applied to the resistor 17 at the time when the fluorescent lamp is started, and $V_{P2}$ represents a peak voltage applied to the resistor 17 during the operation of the fluorescent lamp. The peak voltages $V_{P1}$ and $V_{P2}$ are determined in terms of the resistance value of the resistor 17.

Figure 14A:
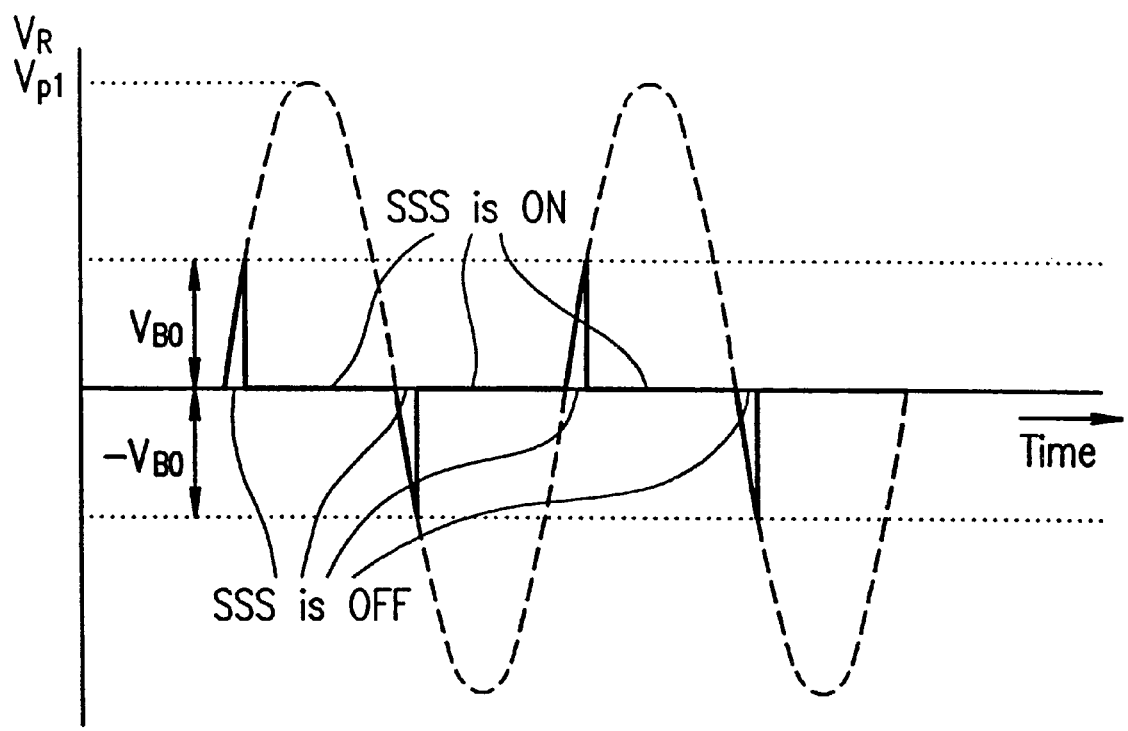
FIG. 14A is a diagram showing the temporal change of the voltage $V_R$ applied to the resistor 17 in a cycle—by—cycle control method, at the time when the fluorescent lamp is started.

The cycle-by-cycle control method will now be described with reference to FIGS. 14A, 14B, 15A and 15B. FIG. 14A shows the temporal change of the voltage $V_R$ applied to the resistor 17 at the time when the fluorescent lamp employing a cycle-by-cycle control method is started. FIG. 15A shows the temporal change of the voltage $V_R$ applied to the resistor 17 during the operation of the fluorescent lamp employing a cycle-by-cycle control method.

In FIGS. 14A and 15A, the dashed lines each represent a comparison data which shows the temporal change of the voltage $V_R$ applied to the resistor 17 in the case where the two-way thyristor 16 is not connected. If the two-way thyristor 16 is not connected, the voltage $V_R$ applied to the resistor 17 changes cyclically as time elapses. As shown in FIG. 14A, $V_{BO}<V_{P1}$, and as shown in FIG. 15A, $V_{BO}<V_{P2}$.

When the voltage $V_R$ exceeds the breakover voltage $V_{BO}$ of the two-way thyristor 16, the two-way thyristor 16 turns on so as to short-circuit both ends of the resistor 17. As a result, the voltage $V_R$ becomes zero. When the polarity of the voltage $V_R$ changes, the two-way thyristor 16 turns off.

Accordingly, the two-way thyristor 16 repeats turning on and turning off corresponding to the cycle of the supply voltage. This makes it possible to control the lamp current corresponding to the phase of the lamp current.

At the time when the fluorescent lamp is started, the voltage applied to the resistor 17 is approximately twice the voltage applied during the operation of the fluorescent lamp. Therefore, the phase control of the starting current during the glow operation is small and the starting ability of the fluorescent lamp is not reduced.

Figure 14B:
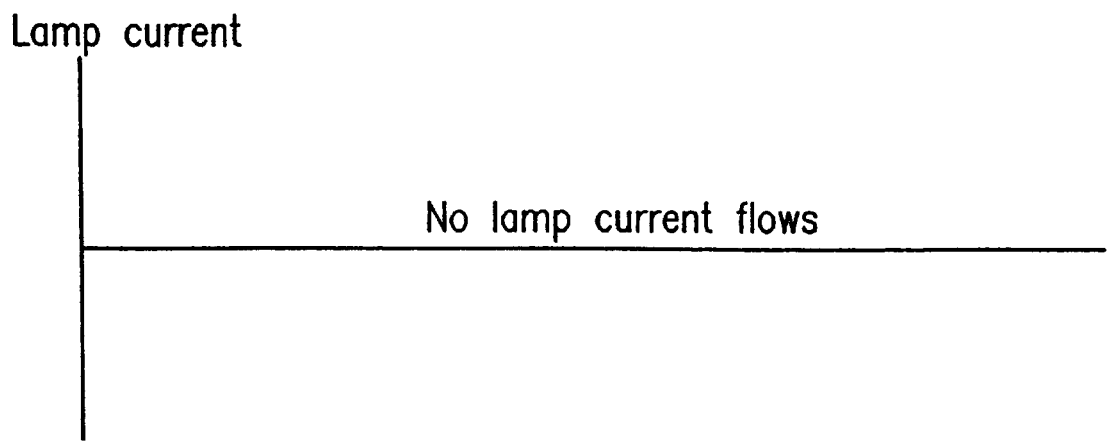
FIG. 14B is a diagram showing the temporal change of the lamp current in the cycle—by—cycle control method, at the time when the fluorescent lamp is started.
Figure 15A:
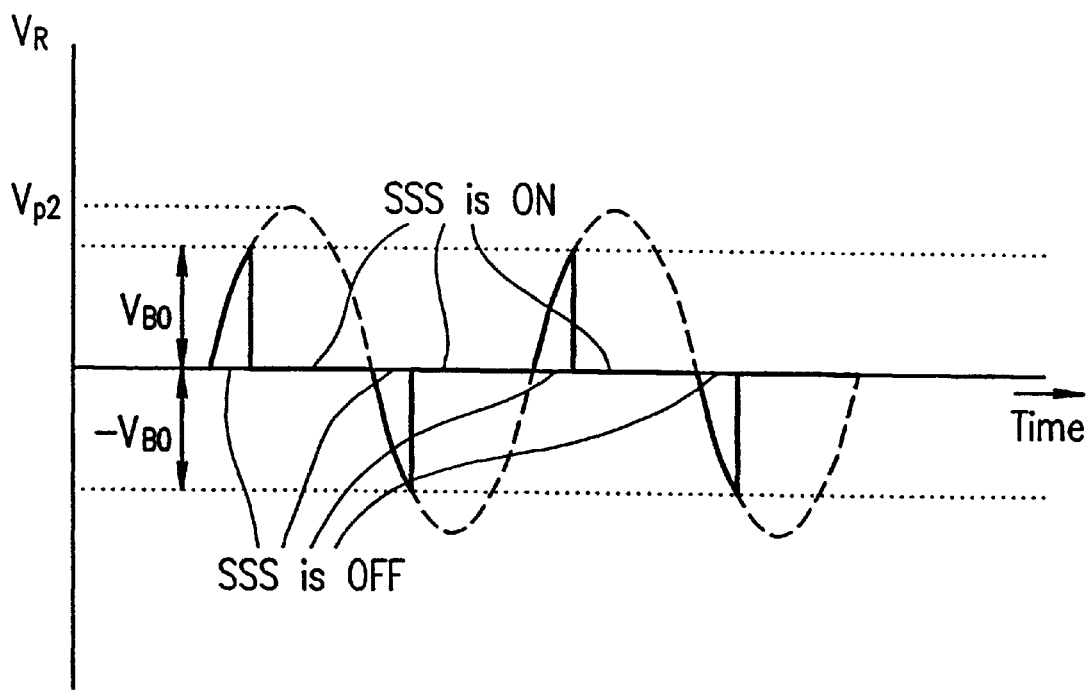
FIG. 15A is a diagram showing the temporal change of the voltage $V_R$ applied to the resistor 17 in the cycle—by—cycle control method, during the operation of the fluorescent lamp.

FIG. 14B shows the temporal change of the lamp current at the time when the fluorescent lamp employing a cycle-by-cycle control method is started. At the time when the fluorescent lamp is started, no lamp current flows in the lamp since the starter 8 is operating.

Figure 15B:
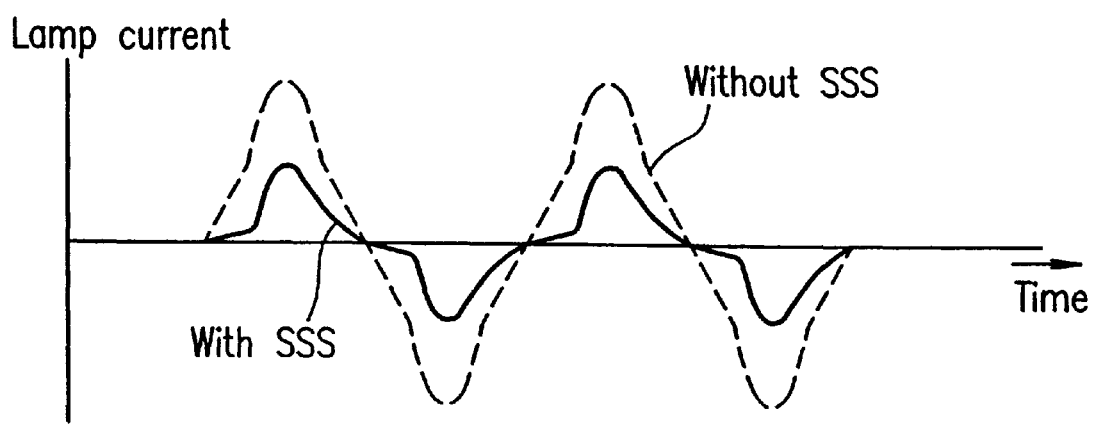
FIG. 15B is a diagram showing the temporal change of the lamp current in the cycle—by—cycle control method, during the operation of the fluorescent lamp.

In FIG. 15B, the solid line represents the temporal change of the lamp current during the operation of the fluorescent lamp employing a cycle-by-cycle control method. The dashed line is a comparison data showing the lamp current according to the conventional example without a current suppressing section 5. As can be seen from FIG. 15B, the two-way thyristor 16 reduces the lamp current during the operation of the fluorescent lamp.

A start supporting method will now be described with reference to FIGS. 16A, 16B, 17A, and 17B.

Figure 16A:
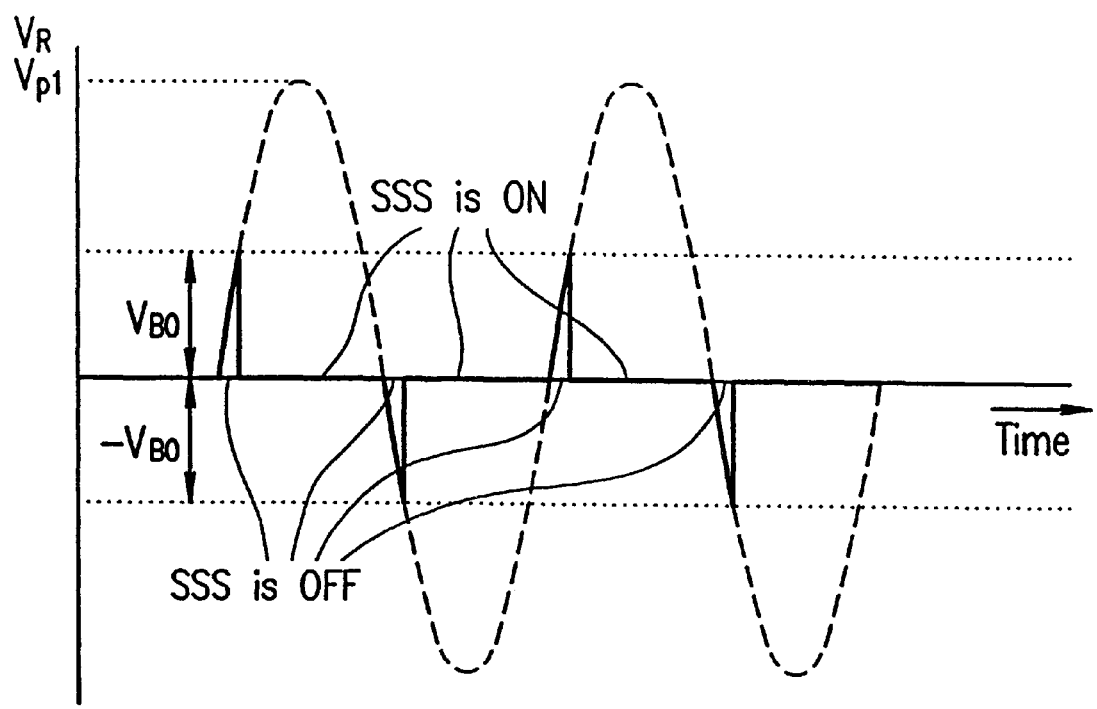
FIG. 16A is a diagram showing the temporal change of the voltage $V_R$ applied to the resistor 17 in a start supporting method, at the time when the fluorescent lamp is started.
Figure 17A:
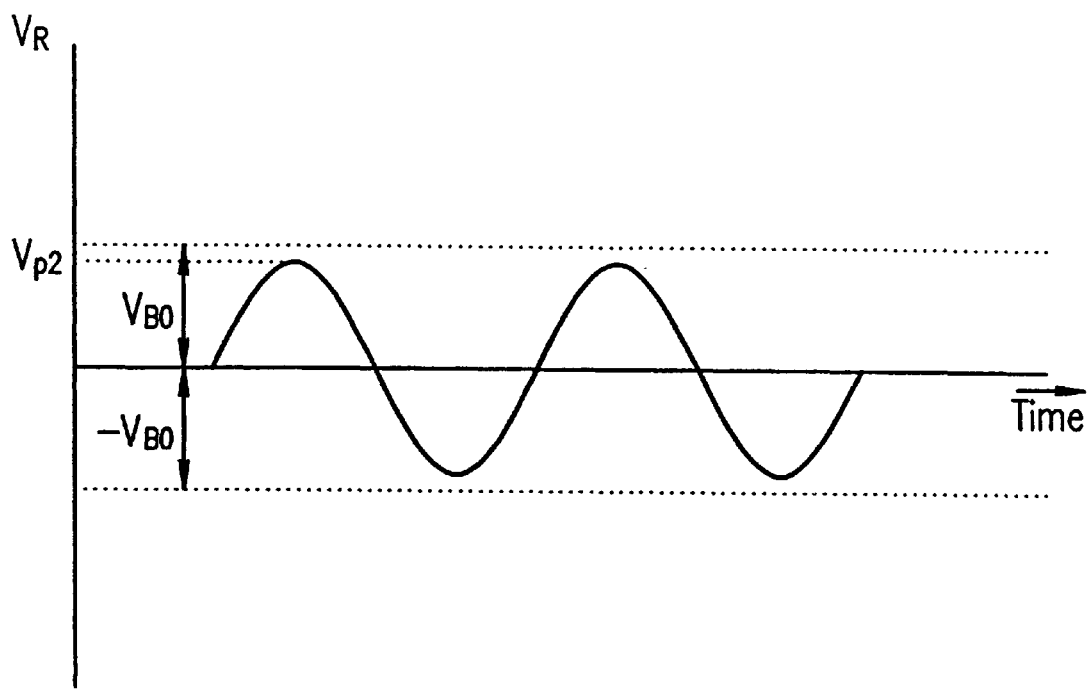
FIG. 17A is a diagram showing the temporal change of the voltage $V_R$ applied to the resistor 17 in the start supporting method, during the operation of the fluorescent lamp.

In FIG. 16A, the solid line represents the temporal change of voltage $V_R$ applied to the resistor 17 at the time when the fluorescent lamp employing a start supporting method is started. In FIG. 17A, the solid line represents the temporal change of voltage $V_R$ applied to the resistor 17 during the operation of a fluorescent lamp employing the start supporting method.

The operation of the thyristor 16 at the time when the fluorescent lamp is started according to the start supporting method is the same as that according to the cycle-by-cycle control method. As described above, the two-way thyristor 16 turns on at the time when the fluorescent lamp is started, whereby the start of the fluorescent lamp is facilitated.

The operation of the thyristor 16 during the operation of the fluorescent lamp according to the start supporting method is different from that according to the cycle-by-cycle control method. According to the start supporting method, a relationship $|V_R|<|V_{BO}|$ is established and therefore the two-way thyristor 16 does not operate during the operation of the fluorescent lamp.

Figure 16B:
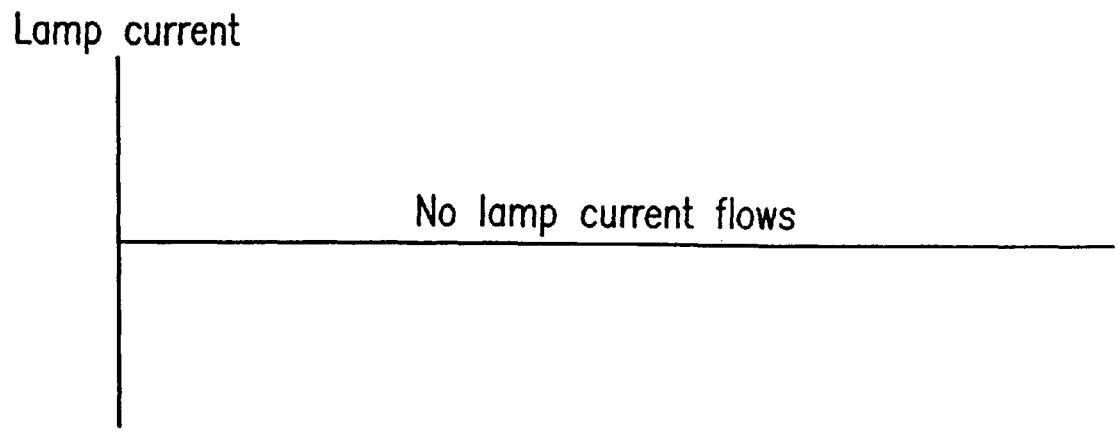
FIG. 16B is a diagram showing the temporal change of the lamp current in the start supporting method, at the time when the fluorescent lamp is started.

FIG. 16B shows the temporal change of the lamp current at the time when a fluorescent lamp employing a start supporting method is started. At the time when the fluorescent lamp is started, no lamp current flows in the lamp since the starter 8 is operating.

Figure 17B:
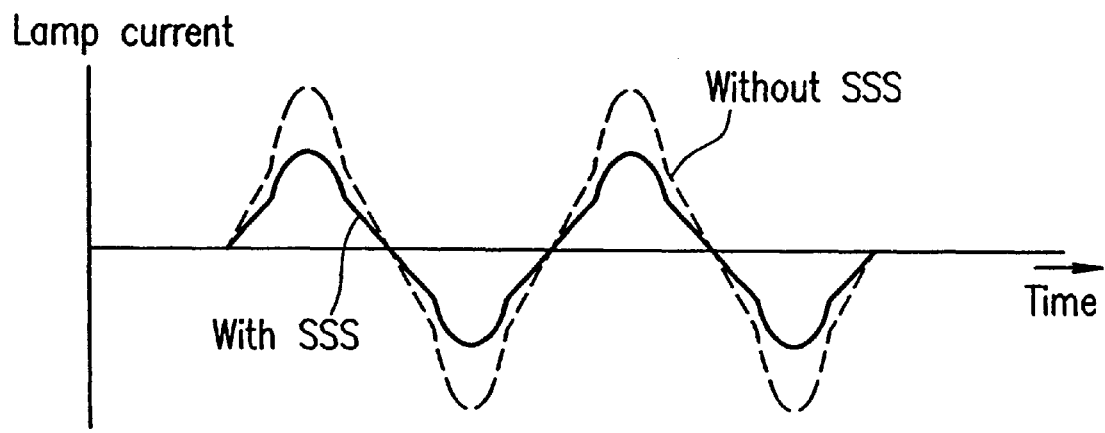
FIG. 17B is a diagram showing the temporal change of the lamp current in the start supporting method, during the operation of the fluorescent lamp.

In FIG. 17B, the solid line represents the temporal change of the lamp current during the operation of the fluorescent lamp employing the start supporting method. The dashed line represents a comparison data showing the lamp current according to the conventional example without a current suppressing section 5. According to the thyristor type current suppressing section 5, the temporal change of the current entering the fluorescent lamp through the power supply-side socket 9 at the time when the fluorescent lamp is started is the same as the temporal change of the current shown in FIG. 5B (i.e., the temporal change of the current in the relay type).

According to the example shown in FIG. 13, the resistor 17 is used as the element connected in parallel to the two-way thyristor 16. It is preferable to use a resistor since the size of resistors can easily be reduced so as to be easily housed in the base 11 (see FIG. 1). Moreover, resistors are highly heat resistant.

As the element connected in parallel to the two-way thyristor 16, elements other than a resistor can also be used. Such elements are, for example, a capacitor, a coil (inductor), or an element combining these. For example, in the case where a capacitor is used as the element connected in parallel to the two-way thyristor 16, an LC resonance circuit is formed by the capacitor and an inductor of the ballast 7 (see FIG. 1). The LC resonance circuit makes it possible to apply a higher voltage to both ends of the two-way thyristor 16. As a result, it is possible to provide the two-way thyristor 16, which has a higher breakover voltage $V_{BO}$.

In the case where a capacitor is used as the element connected in parallel to the two-way thyristor 16, it is preferable to connect a resistor in series of the two-way thyristor 16 so as to prevent an overcurrent from flowing in the thyristor 16. The capacitor is preferably connected in parallel to the serial circuit of the two-way thyristor 16 and the resistor. This configuration prevents a discharge current from the capacitor from flowing instantaneously into the two-way thyristor 16 when the two-way thyristor 16 turns on. Therefore the two-way thyristor 16 is protected from the discharge current.

In the examples described above, the current suppressing section 5 suppresses the lamp current based on the temperature or the current as a parameter. Note, however, the type of the parameter is not limited to the temperature or the current. The current suppressing section 5 can be configured so as to suppress the lamp current based on at least one parameter. Such parameters include, for example, time, temperature, luminous energy, current, and voltage.

(A method for mounting a current suppressing section 5)

A method for mounting a current suppressing section 5 according to the present invention will now be described. For the current suppressing section 5, the thermosensitive type described above is used.

Figure 10A:
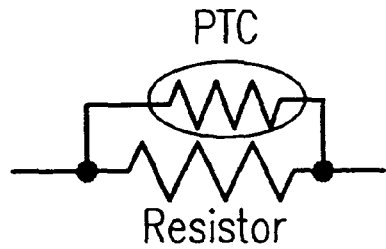
FIG. 10A is a circuit diagram of a current suppressing section 5 including a PTC thermistor and a current suppressing resistor.
Figure 10B:
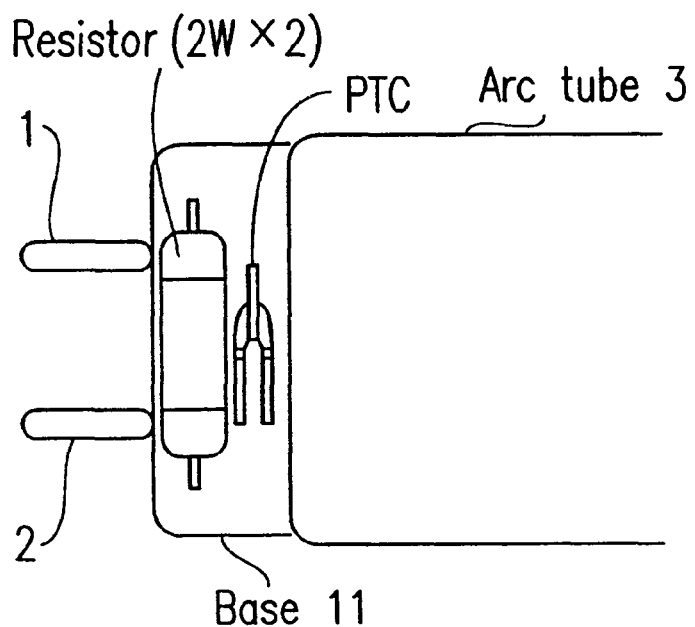
FIG. 10B is a diagram showing an example in which the PTC thermistor and the current suppressing resistor are mounted in the lamp base 11.
Figure 10C:
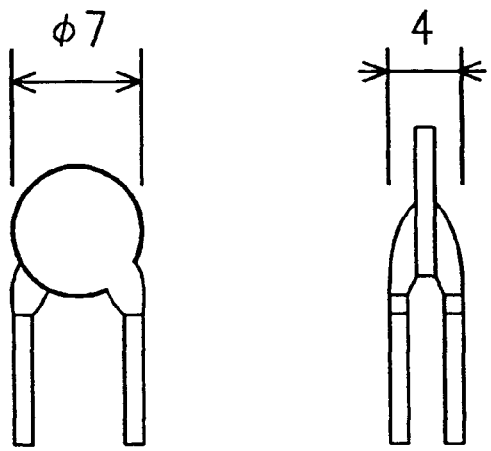
FIG. 10C is a diagram showing the exterior of the PTC thermistor.

FIG. 10A is a circuit diagram of a current suppressing section 5 including a PTC thermistor and a resistor for suppressing a current. FIG. 10B shows an example in which the PTC thermistor and the resistor for suppressing a current are mounted in the base 11 of the lamp. FIG. 10C shows an outer diameter and a thickness of the PTC thermistor.

For the PTC thermistor, PTH8L power thermistor (Posistor) made by Murata Manufacturing Co., Ltd. can be used. This thermistor has a resistance of 5 Ω at 25° C., and a Curie temperature of 80° C. The power thermistor is an element with a disk-like shape having an outer diameter of 7 mm and a thickness of 4 mm, as shown in FIG. 10C. The resistor for suppressing the lamp current has a resistance value of about 70 Ω.

According to the example shown in FIG. 10B, in view of a power consumption at a lamp current of 200 mA being about 3 W, and the space inside the base 11, two resistors with a power of 2 W and a resistance value of 150 Ω are connected in parallel (the combined power is 4 W). However, the current suppressing section 5 of the type shown in FIG. 3A or 5A described above, or the type shown in FIG. 11 described later may also be mounted in the base 11.

Although the example of mounting the current suppressing section 5 in the base 11 is shown, it may be sealed in the arc tube 3.

Alternatively, the current suppressing section 5 may be configured as a separate device, i.e., an adapter, by installing the current suppressing section 5 between the lamp electrode and the electrode socket of the lighting apparatus. The electronic components used for the current suppressing section 5 have longer lives than the lamp itself. Accordingly, only the lamp can be replaced when the life of the lamp is about to expire. Therefore, the cost of replacing the fluorescent lamp is reduced.

(Methods for connecting the fluorescent lamp)

Methods for connecting the fluorescent lamp according to the present invention will now be described. In the case where the thermosensitive element type current suppressing section 5 shown in FIG. 4A is used, the fluorescent lamp can be operated in a different mode by inverting the connection of the first electrode pin 1 and the second electrode pin 2 to the power supply-side socket 9 and the starter-side socket 10. In other words, when the first electrode pin 1 is connected to the power supply-side socket 9 and the second electrode pin 2 is connected to the starter-side socket 10, which is a first connection state, the fluorescent lamp operates in a first power mode, in which the fluorescent lamp consumes a first power. When the first electrode pin 1 is connected to the starter-side socket 10 and the second electrode pin 2 is connected to the power supply-side socket 9, which is a second connection state, the fluorescent lamp operates in a second power mode, in which the fluorescent lamp consumes a second power which is lower than the first power.

The above example which employs a thermosensitive element type current suppressing section 5 will now be described in more detail. The connection state shown in FIG. 1 is the second power mode. When the fluorescent lamp is operated in this mode, the lamp power will be 14.5 W. The same fluorescent lamp can be operated in the first power mode when the first electrode pin 1 is connected to the power supply-side socket 9 and the second electrode pin 2 is connected to the starter-side socket 10. In this mode, the resistor for suppressing the lamp current is connected between the contact points A and C, and the thermosensitive thermistor (PTC thermistor) is connected in parallel to the resistor. At the time when the fluorescent lamp is started, the temperature of the PTC thermistor is low, and therefore the sufficient preheating current flows in the filament 4, thereby the fluorescent lamp is easily started. When the lamp starts operating, the operation power is 18 W since the lamp current is not suppressed. As described above, according to the fluorescent lamp of the present invention, the user can select two different power modes, i.e., a mode with a lamp power of 14.5 W and a mode with a lamp power of 18 W, by changing the connection between the fluorescent lamp and the lighting apparatus. For example, in case of a straight tube fluorescent lamp, the power mode can be selected depending on whether or not the lamp is attached to the fluorescent lamp lighting apparatus by turning the lamp by 180° around the lamp axis.

Another fluorescent lamp will now be described with reference to FIG. 11, in which the current suppressing section 5 includes a first current suppressing circuit connected to the first electrode pin 1 and a second current suppressing circuit connected to the second electrode pin 2.

Figure 11:
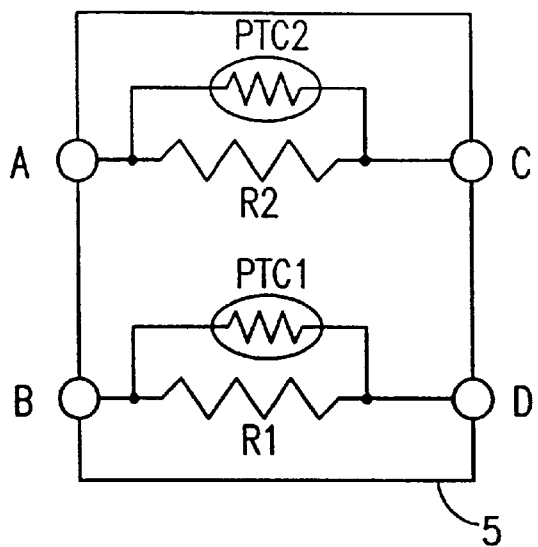
FIG. 11 is a diagram showing a current suppressing section 5 connecting respective resistors between contact points A and C and between contact points B and D, and further connecting respective thermistors (PTC thermistor) parallel to these resistors.

As shown in FIG. 11, a first resistor R1 is connected between the contact points B and D, and a first thermosensitive thermistor PTC1 is connected in parallel to the first resistor R1. A second resistor R2 is connected between the contact points A and C, and a second thermosensitive thermistor PTC2 is connected in parallel to the second resistor R2. The first resistor R1 forms a first current suppressing circuit, and the second resistor R2 forms a second current suppressing circuit.

When the fluorescent lamp is attached so as to connect the first electrode pin 1 to the power supply-side socket 9, the fluorescent lamp is started in the first power mode determined by the current suppression by the resistor R2. When the fluorescent lamp is attached so as to connect the second electrode pin 2 to the power supply-side socket 9, the fluorescent lamp is started in the second power mode determined by the current suppression by the resistor R1. If R1 is not equal to R2, the quantity of the current suppressed by the first current suppressing circuit and the quantity of the current suppressed by the second current suppressing circuit are different. Accordingly, a user can select a power mode by selecting the method for attaching the lamp. Furthermore, if the Curie points (operating temperatures) of the PTC1 and PTC2 are differentiated, the temperature characteristics of the total flux will also be selectable.

In the configuration of FIG. 11, if R1 and R2 are set equal and the same type of element is used for PTC1 and PTC2, the quantity of the current suppressed by the first current suppressing circuit and the quantity of the current suppressed by the second current suppressing circuit become substantially the same. In this case, the same power mode is always achieved whether the first electrode pin 1 is connected to the power supply-side socket 9 or the starter-side socket 10. Therefore, the lamp can be operated in the same power mode whether or not a user inverts the connection of the first electrode pin 1 and the second electrode pin 2 to the power supply-side socket 9 and the starter-side socket 10.

(Markings of the fluorescent lamp)

Figure 12:
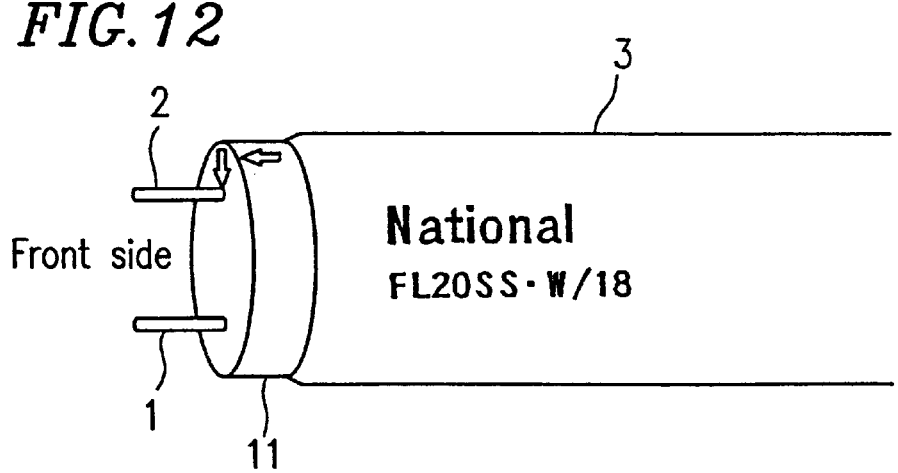
FIG. 12 is a diagram showing an example in which the fluorescent lamp has markings showing power modes.
Figure 12:
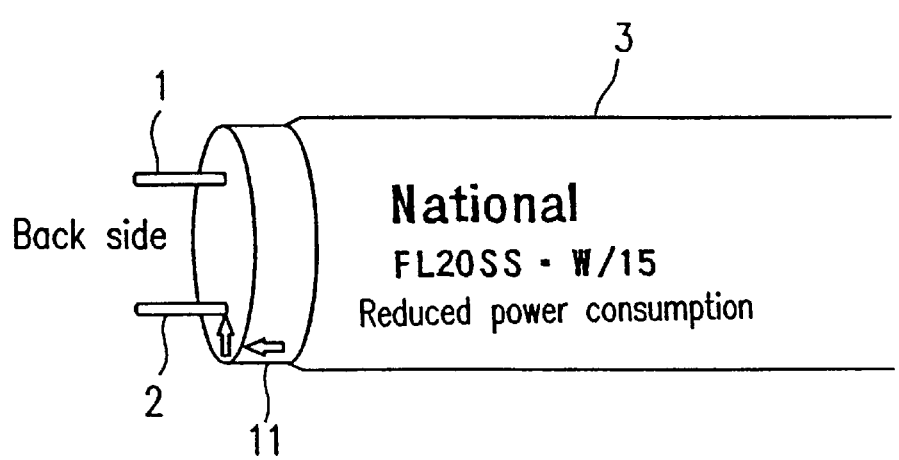

Markings of the fluorescent lamp according to the present invention will now be described. The fluorescent lamp may be labeled with marks which distinguish the power modes described above. FIG. 12 shows the case where the first power mode is 18 W and the second power mode is 15 W. When the fluorescent lamp is attached to the lighting apparatus, the marks appear in the front side of the apparatus so as to represent the power mode currently in operation.

According to the present example, the arc tube 3 bear letters as shown in FIG. 12, and the base 11 has arrows showing the position of the second electrode pin 2 shown in FIG. 1. The base 11 includes in its interior one of the current suppressing sections 5 described above.

By making use of these marks when attaching the fluorescent lamp to the lighting apparatus, the desired power mode may be unmistakably selected at a glance.

Although the marking is applied on both the arc tube 3 and the base 11 in the example shown in FIG. 12, the marking can be applied on only one of the arc tube 3 and the base 11.

(A fluorescent material used for the fluorescent lamp)

A fluorescent material used for the fluorescent lamp according to the present invention will now be described. JIS (Japan Industrial Standard) Z9112 "The classification of fluorescent lamps by the light source color and the chromaticity" provides a standard which defines the chromaticity range of fluorescent lamps for general purposes. According to this standard, white light fluorescent lamps using a calcium halophosphate fluorescent material have been widely used for lighting the public spaces of conventional multi-unit housings, streets, factories, and warehouses. The lamp efficiency of these lamps, which mainly employ a calcium halophosphate fluorescent material, is in the range of 70 to 80 lm/W. If the aforementioned light suppressing section 5 is incorporated in the fluorescent lamps having these light colors, the lamp efficiency does not change, and therefore the total flux of the lamp decreases by 20% as the lamp power decreases by about 20%. Accordingly, a reduction of the power consumption is achieved only by attaching this kind of fluorescent lamps, whereas the conventional lamps require a partial operation.

Furthermore, by using a fluorescent lamp which, based on categorical color perception theory, is applied with a fluorescent material limiting the color rendering property of the lamp to a moderate degree while increasing the luminous efficiency, a 20 to 30% increase of the total flux can be achieved with the same lamp power (see Simizu, et al., "Two-Band Type Fluorescent Lamp", National Technical Report, Vol. 43, No. 2, pp. 174–180, (1997)). Such a fluorescent lamp can achieve a lamp efficiency of 80 lm/W or more, by applying a fluorescent material, based on the categorical color perception theory as described above. The subject matter of the above publication is incorporated herein by reference for this teaching. By combining this kind of fluorescent lamp with the current suppressing section 5 described above, the lamp power is reduced by 20% or more in comparison with the conventional example as well as maintaining the total flux equal to or greater than that in the conventional example. Therefore, a reduction of the power consumption in lighting is achieved only by attaching the fluorescent lamp of the present invention to a conventional fluorescent lamp lighting apparatus and without ruining the lighting conditions such as brightness and light distribution.

For example, if an FL20 fluorescent lamp attached to a fluorescent lamp lighting apparatus for 20 W power is operated by a power of 20 W, the total flux can be increased by 20 to 30% in comparison with the conventional example. By utilizing such an advantage, the present invention can provide a fluorescent lamp which has the same total flux as a conventional white light fluorescent lamp of the same power standard, while still suppressing the power by 20 to 30% compared to the conventional example, and which is capable of being started by a conventional lighting apparatus with a magnetic ballast.

Table 1 shows photoelectric characteristics of an FL20SSW/18 fluorescent lamp started by supplying the power through each embodiment of the current suppressing section 5 embodiments described above.

TABLE 1

(A commercial ballast is used at a normal temperature)

| Current suppressing section | | System power (Lamp + ignition device) [W] | Lamp voltage (Ignition tube voltage) [V] | Lamp current [A] | Lamp power [W] | Flux ratio | Efficiency $\left(\frac{\text{flux ratio}}{\text{system power}}\right)$ | Cost | Ease of mounting |
|---|---|---|---|---|---|---|---|---|---|
| Not provided | | 21.3 (1.00) | 67.6 | 0.332 | 18.0 (1.00) | 1.00 | 1.00 | | |
| C = 3.9 μF | | 13.5 (0.63) | 71.9 | 0.219 | 11.8 (0.66) | 0.67 | 1.06 | | |
| R = 68 Ω | | 17.2 (0.81) | 72.7 | 0.217 | 12.5 (0.69) | 0.71 | 0.88 | | |
| Thermosensitive element type | PTC thermistor + Resistor | 17.4 (0.88) | 74.1 | 0.236 | 15.7 (0.87) | 0.81 | 0.99 | ◉ | o |
| Relay type | IC relay + Capacitor | 16.1 (0.81) | 67.8 | 0.265 | 14.9 (0.83) | 0.86 | 1.06 | x | x |
| Thyristor type | SSS + Capacitor (Cycle-by-cycle control method) | 15.3 (0.77) | 73.7 | 0.238 | 14.4 (0.80) | 0.81 | 1.05 | o | Δ |
| | SSS + Capacitor (Start supporting method) | 16.1 (0.81) | 67.8 | 0.265 | 14.9 (0.83) | 0.86 | 1.06 | o | x |

Legend{◉: Excellent o: Good Δ: Intermediate x: Bad

For example, the thermosensitive element type current suppressing section 5 shown in FIG. 4A includes in its interior a PTC thermistor and a resistor, of which the resistor contributes to the suppression of the power consumption of the fluorescent lamp. Similarly, the resistor type current suppressing section 5 shown in FIG. 3A includes in its interior only a resistor, and the resistor contributes to the suppression of the power consumption of the fluorescent lamp. In Table 1, the lamp power for the fluorescent lamp embodiment with a resistor type current suppressing section 5 does not include the power consumption of the resistor itself (about 2 W). With the power consumption of the resistor included, the lamp power for the fluorescent lamp embodiment with a resistor type current suppressing section 5 will be 14.5 W.

In view of the "system power" column of Table 1, it is understood that, by using each of the current suppressing section 5 embodiments described in the preferred examples of the present invention, the power consumption is reduced in comparison with the conventional example (i.e., no current suppressing section is implemented).

In the "cost" column of the Table 1, "⊚" represents the lowest cost, "○" represents the second lowest cost, and "X" represents that the cost is the highest.

In the "ease of the mounting" column of the Table 1, "○" represents that the current suppressing section 5 can be housed in the base of both a fluorescent lamp for a power of 20 W (FL20 fluorescent lamp) and a fluorescent lamp for a power of 40 W (FL40 fluorescent lamp). "Δ" represents that the current suppressing section 5 can be housed in the base of a fluorescent lamp for a power of 40 W (FL40 fluorescent lamp) but not of a fluorescent lamp for a power of 20 W (FL20 fluorescent lamp). "X" represents that the current suppressing section 5 can be housed in the base of neither a fluorescent lamp for a power of 20 W (FL20 fluorescent lamp) nor a fluorescent lamp for a power of 40 W (FL40 fluorescent lamp).

In consideration of the "cost" and the "ease of the mounting", the thermosensitive element type and the thyristor type (cycle-by-cycle control method) current suppressing section 5 are excellent.

When the capacitor is used, the effect on reducing the system power is great. Since a capacitor having a low voltage tolerance can be used for the cycle-by-cycle control method, the size of the current suppressing section 5 can be reduced. Although not shown in Table 1, regarding the fluctuation characteristics of the supply voltage, the thyristor type (start supporting method), in which a two-way thyristor and a capacitor are connected in parallel, and the relay type current suppressing sections 5 are excellent.

As is apparent from the above description, according to a fluorescent lamp of the present invention, the fluorescent lamp can be operated in a different mode by inverting the connection of the first electrode pin and the second electrode pin to the power supply-side socket and the starter-side socket.

According to the present invention, a fluorescent lamp having a mark for identifying whether the fluorescent lamp is in the first connection state or the second connection state. Therefore, a user can select the desired power mode unmistakably at a glance, by utilizing the markings applied on the fluorescent lamp when attaching the fluorescent lamp to the lighting apparatus.

Furthermore, the fluorescent lamp can be operated in the same power mode even when a user inverts the connection of the first electrode pin and the second electrode pin to the power supply-side socket and the starter-side socket.

Furthermore, a current suppressing section suppresses the lamp current flowing in the arc tube, after the elapse of a predetermined time after the power is on, and during an operation of the fluorescent lamp, thereby reducing the power consumption of the lamp.

Various other modifications will be apparent to and can be readily made by those skilled in the art without departing from the scope and spirit of this invention. Accordingly, it is not intended that the scope of the claims appended hereto be suppressed to the description as set forth herein, but rather that the claims be broadly construed.

What is claimed is:
1. A fluorescent lamp, comprising:
   a first electrode pin;
   a second electrode pin;
   current suppression means; and
   a filament electrically connected to the first electrode pin and the second electrode pin via the current suppression means,
      wherein the first electrode pin and the second electrode pin are configured so as to be respectively connectable to a power supply-side socket and a starter-side socket of a lighting apparatus,
      when the fluorescent lamp is in a first connection state, in which the first electrode pin is connected to the power supply-side socket and the second electrode pin is connected to the starter-side socket with a current flowing in a starter for the fluorescent lamp connected to the starter-side socket, the fluorescent lamp operates in a first power mode, in which the fluorescent lamp consumes a first power,
      when the fluorescent lamp is in a second connection state, the first electrode pin is connected to the starter-side socket and the second electrode pin is connected to the power supply-side socket with no current flowing in the starter, the fluorescent lamp operates in a second power mode, in which the fluorescent lamp consumes a second power which is lower than the first power, and
      the current suppression means employs at least two connection lines which respectively connect the filament to the first electrode pin and the filament to the second electrode pin, and are continuous under all operating conditions.
2. A fluorescent lamp according to claim 1, wherein the current suppression means is a current suppression circuit electrically connected to one of the first electrode pin and the second electrode pin.
3. A fluorescent lamp according to claim 1, wherein the current suppression means comprises a first current suppressing circuit electrically connected to the first electrode pin and a second current suppressing circuit electrically connected to the second electrode pin, and the quantity of a current suppressed by the first current suppressing circuit and the quantity of a current suppressed by the second current suppressing circuit are different.
4. A fluorescent lamp according to claim 2, wherein the current suppressing circuit is provided inside a base for fixing the first electrode pin and the second electrode pin.
5. A fluorescent lamp according to claim 1, wherein the fluorescent lamp has a mark for identifying whether the fluorescent lamp is in the first connection state or the second connection state.
6. A fluorescent lamp, comprising:
   a first electrode pin;
   a second electrode pin;
   a filament electrically connected to the first electrode pin and the second electrode pin;
   a first current suppressing circuit electrically connected to the first electrode pin and the filament; and
   a second current suppressing circuit electrically connected to the second electrode pin and the filament, wherein the quantity of a current suppressed by the first current suppressing circuit and the quantity of a current suppressed by the second current suppressing circuit are substantially the same such that either the first or second current suppressing circuit can be connected to a starter for the fluorescent lamp which is not in operation during an operation of the fluorescent lamp, and the first and second current suppressing circuits employ continuous connections between the first and second electrode pins and the filament under all operating conditions.

7. A fluorescent lamp according to claim 6, wherein the first current suppressing circuit and the second current suppressing circuit are provided inside a base for fixing the first electrode pin and the second electrode pin.

8. A fluorescent lamp, comprising:

an arc tube; and a current suppressing section for suppressing a lamp current which flows in the arc tube via a first electrode pin and a second electrode pin, after the elapse of a predetermined time after the power is turned on, and during an operation of the fluorescent lamp during which a current does not flow through a starter for the fluorescent lamp connected to the first electrode pin, wherein the current suppressing section employs at least two connection lines which respectively connect the first electrode pin and the arc tube and the second electrode pin and the arc tube, and are continuous under all operating conditions.

9. A fluorescent lamp according to claim 8, wherein the current suppressing section suppresses the lamp current based on at least one of the parameters representing time, temperature, luminous energy, current and voltage.

10. A fluorescent lamp according to claim 8, wherein the fluorescent lamp efficiency is 80 lm/W or more.

11. A fluorescent lamp according to claim 8, wherein the current suppressing section comprises an impedance varying section for varying the impedance of the current suppressing section.

12. A fluorescent lamp according to claim 11, wherein the impedance varying section comprises a thermosensitive element.

13. A fluorescent lamp according to claim 8, wherein the current suppressing section comprises a phase control section for controlling the quantity of the lamp current corresponding to the phase of the lamp current.

14. A fluorescent lamp according to claim 13, wherein the phase control section comprises a two-way thyristor.

15. A fluorescent lamp according to claim 8, wherein a chromaticity coordinate of a light source color of the arc tube meets the standard JIS Z9112-1990 "The classification of fluorescent lamps by the light source color and the chromaticity".

* * * * *